(12) United States Patent
Oku et al.

(10) Patent No.: US 9,496,568 B2
(45) Date of Patent: Nov. 15, 2016

(54) FUEL CELL

(75) Inventors: Takanori Oku, Yokohama (JP);
Manabu Sugino, Fujisawa (JP);
Shigetaka Uehara, Kamakura (JP);
Mitsutaka Abe, Yokohama (JP)

(73) Assignee: NISSAN MOTOR CO., LTD.,
Yokohama-Shi (JP)

( * ) Notice: Subject to any disclaimer, the term of this patent is extended or adjusted under 35 U.S.C. 154(b) by 28 days.

(21) Appl. No.: 14/007,559

(22) PCT Filed: Apr. 4, 2012

(86) PCT No.: PCT/JP2012/059199
§ 371 (c)(1),
(2), (4) Date: Sep. 25, 2013

(87) PCT Pub. No.: WO2012/137820
PCT Pub. Date: Oct. 11, 2012

(65) Prior Publication Data
US 2014/0023954 A1    Jan. 23, 2014

(30) Foreign Application Priority Data

Apr. 7, 2011    (JP) .................................. 2011-085524

(51) Int. Cl.
*H01M 8/04*    (2016.01)
*H01M 8/24*    (2016.01)
(Continued)

(52) U.S. Cl.
CPC ....... *H01M 8/04104* (2013.01); *H01M 8/0254* (2013.01); *H01M 8/0273* (2013.01); *H01M 8/1002* (2013.01); *H01M 8/242* (2013.01); *H01M 2008/1095* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

2009/0286121 A1    11/2009    Morimoto et al.
2012/0003561 A1    1/2012    Ogawa et al.

FOREIGN PATENT DOCUMENTS

| JP | 6-333581 A | 12/1994 |
|---|---|---|
| JP | 11-354142 A | 12/1999 |

(Continued)

OTHER PUBLICATIONS

Supplementary European Search Report dated Jan. 22, 2015, 5 pgs.

*Primary Examiner* — Patrick Ryan
*Assistant Examiner* — Wyatt McConnell
(74) *Attorney, Agent, or Firm* — Foley & Lardner LLP (57) ABSTRACT

Provided is a fuel cell including: a membrane electrode assembly (30) formed by joining an anode (32) to one surface of an electrolyte membrane (31) and joining a cathode (33) to another surface of the electrolyte membrane (31); a frame body (20) formed integrally with the membrane electrode assembly (30); and a pair of separators (40, 41) holding the membrane electrode assembly (30) and the frame body (20) therebetween. At least one pair of holding pieces (42, 43) holding the membrane electrode assembly (30) therebetween is formed in the pair of separators (40, 41). Positions of holding end portions (42a, 43a) of the pair of holding pieces (42, 43) are shifted from each other in a stacking direction of the fuel cell.

11 Claims, 9 Drawing Sheets

(51) Int. Cl.
*H01M 8/02* (2016.01)
*H01M 8/10* (2016.01)

(56) References Cited

FOREIGN PATENT DOCUMENTS

| | | |
|---|---|---|
| JP | 2000-12050 A | 1/2000 |
| JP | 2007-59187 A | 3/2007 |
| JP | 2008-21515 A | 1/2008 |
| JP | 2008-171783 A | 7/2008 |
| JP | 2010-231902 A | 10/2010 |

FUEL CELL

TECHNICAL FIELD

The present invention relates to a fuel cell which generates power by causing a hydrogen-containing gas and an oxygen-containing gas to separately flow into and out from an anode and a cathode.

BACKGROUND ART

Figure 9:
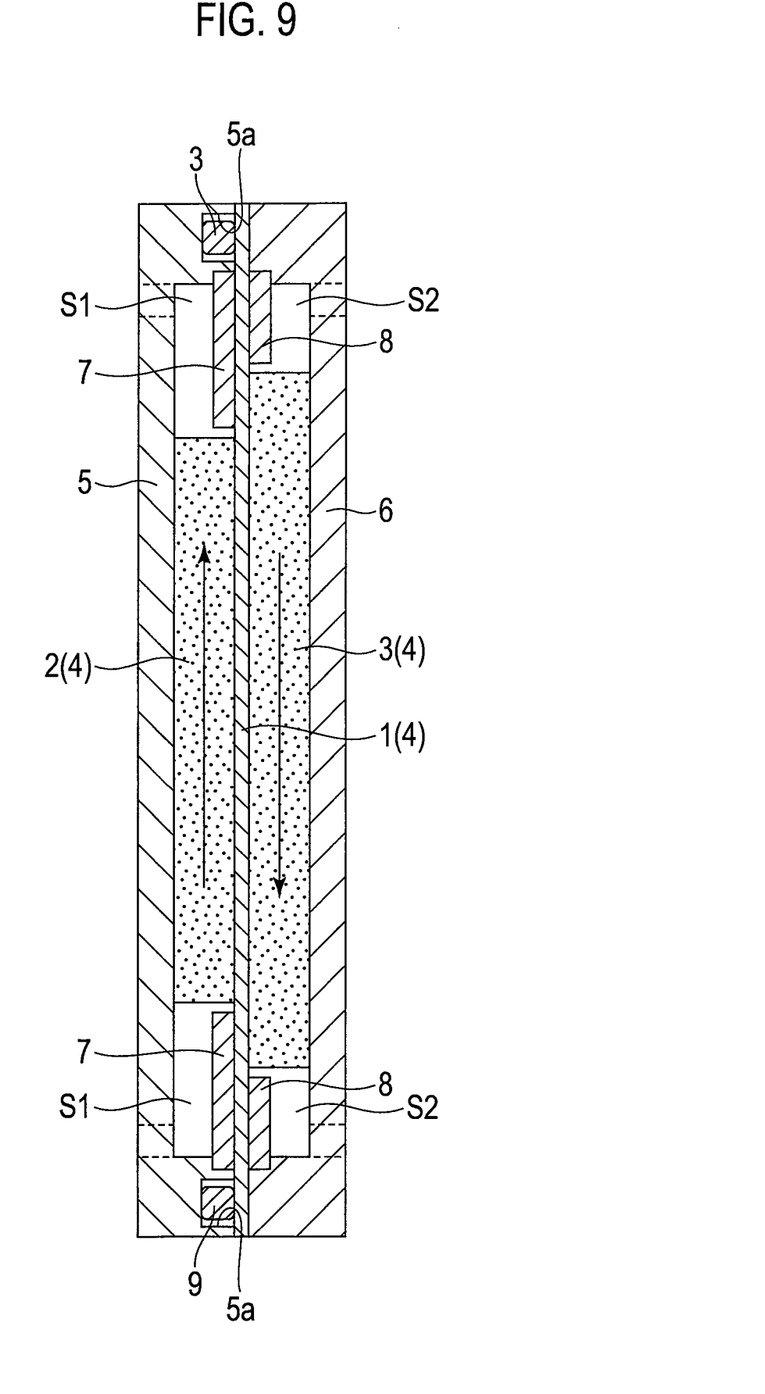
FIG. 9 is a cross-sectional view showing a main portion of a conventional fuel cell.

Japanese Patent Application Publication No. 2008-171783 discloses a fuel cell in which, as shown in FIG. 9, a membrane electrode assembly 4 formed by joining an anode 2 to one surface of a solid polymer electrolyte membrane 1 and joining a cathode 3 to the other surface thereof is held by an anode-side separator 5 and a cathode-side separator 6. A passage for supplying a hydrogen-containing gas to the anode 2 is formed in the anode-side separator 5 while a passage for supplying an oxygen-containing gas to the cathode 3 is formed in the cathode-side separator 6.

Moreover, the solid polymer electrolyte membrane 1 is held by first supporting members 7 and second supporting members 8. The first supporting members 7 are integral with the anode-side separators 5 and are in contact with the solid polymer electrolyte membrane 1 outside electrode ends of the anode 2 in a plane direction. The second supporting members 8 are integral with the cathode-side separator 6 and are in contact with the solid polymer electrolyte membrane 1 outside electrode ends of the cathode 3 in the plane direction. In the fuel cell, a recessed portion 5a is formed in a peripheral edge of the anode-side separator 5 and an O-ring 9 is fitted into the recessed portion 5a to seal the gases.

SUMMARY OF INVENTION

Technical Problem

In the fuel cell described above, since the fuel gas is supplied to the anode 2 at a high pressure, a pressure difference (hereafter, referred to as "differential pressure") is sometimes generated between the anode 2 and the cathode 3. At this time, the solid polymer electrolyte membrane 1 and the first and second supporting members 7, 8 interposed between the anode 2 and the cathode 3 receives a load attributable to the differential pressure.

Meanwhile, in the fuel cell described above, spaces S1, S2 are defined and formed around the first and second supporting members 7, 8 and the first and second supporting members 7, 8 are spaced away from the O-ring 9 by a large distance. Accordingly, the solid polymer electrolyte membrane 1 greatly deforms together with the first and second supporting members 7, 8 every time the differential pressure is generated.

Specifically, bending stress and shearing force repeatedly act on base end portions of the first and second supporting members 7, 8 and the solid polymer electrolyte membrane 1 due to the deformation occurring every time the differential pressure is generated. Hence, in the fuel cell described above, the first and second supporting members 7, 8 and the solid polymer electrolyte membrane 1 may break due to this repeated load.

An object of the present invention is to provide a fuel cell capable of preventing breakage caused by stress attributable to the differential pressure between the hydrogen-containing gas and the oxygen-containing gas.

Solution to Problem

One aspect of the present invention is a fuel cell including: a membrane electrode assembly formed by joining an anode to one surface of an electrolyte membrane and joining a cathode to another surface of the electrolyte membrane; a frame body formed integrally with the membrane electrode assembly; and a pair of separators holding the membrane electrode assembly and the frame body therebetween. At least one pair of holding pieces holding the membrane electrode assembly therebetween are formed in the pair of separators. Positions of holding end portions of the pair of holding pieces are shifted from each other in a stacking direction of the fuel cell.

DESCRIPTION OF EMBODIMENTS

Embodiments of the present invention are described below with reference to the drawings. The embodiments are examples in which the present invention is applied to a solid polymer electrolyte fuel cell mounted on a vehicle. Note that, in description of the drawings, the same elements are denoted by the same reference numerals and overlapping description is omitted. Moreover, in some cases, proportions of dimensions in the drawings may be exaggerated and be different from actual proportions for the sake of description. Furthermore, in the description of the drawings, for convenience, a direction in which multiple fuel cells are stacked is referred to as a stacking direction $\alpha$, a direction which is parallel to a longitudinal direction of the fuel cells and which is perpendicular to the stacking direction $\alpha$ is referred to as a cell longitudinal direction $\beta$, and a direction which perpendicular to the directions $\alpha$ and $\beta$ are referred to as a cell width direction $\gamma$.

First Embodiment

Fuel cells A1 of a first embodiment of the present invention and a fuel cell stack 10 using the fuel cells A1 are described with reference to FIGS. 1 to 7.

Figure 1:
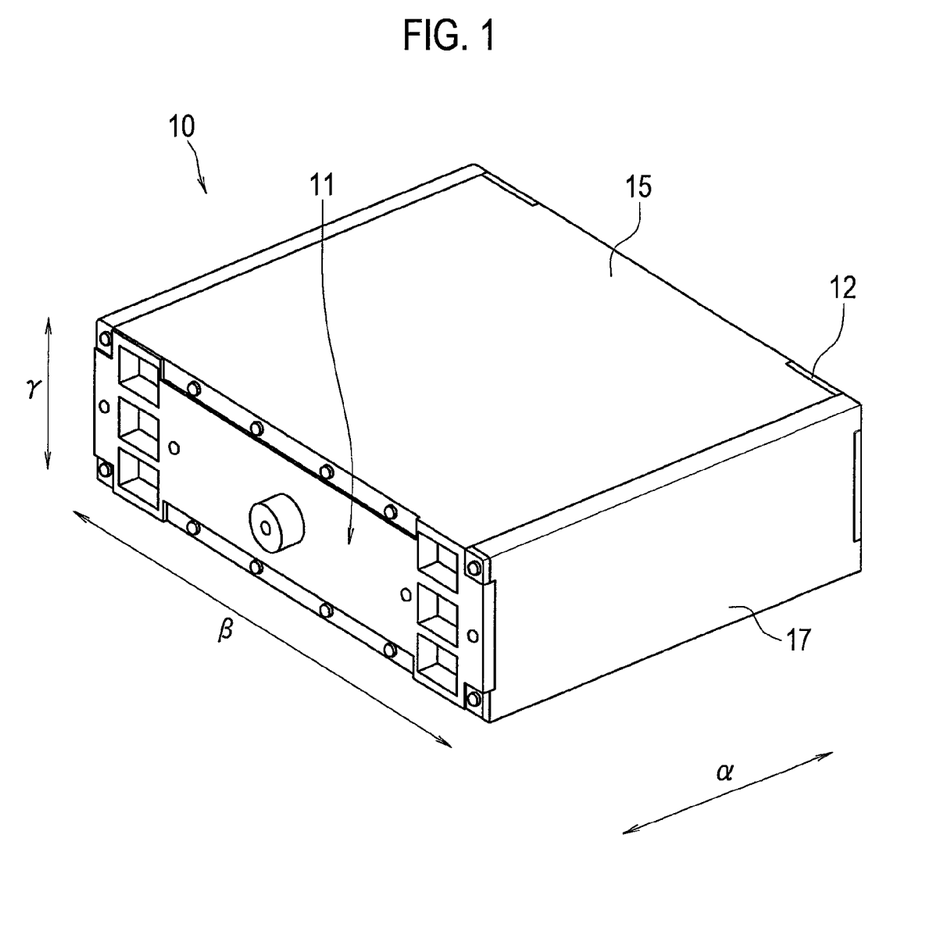
FIG. 1 is a perspective view of an exterior of a fuel cell stack using fuel cells in a first embodiment of the present invention.
Figure 2:
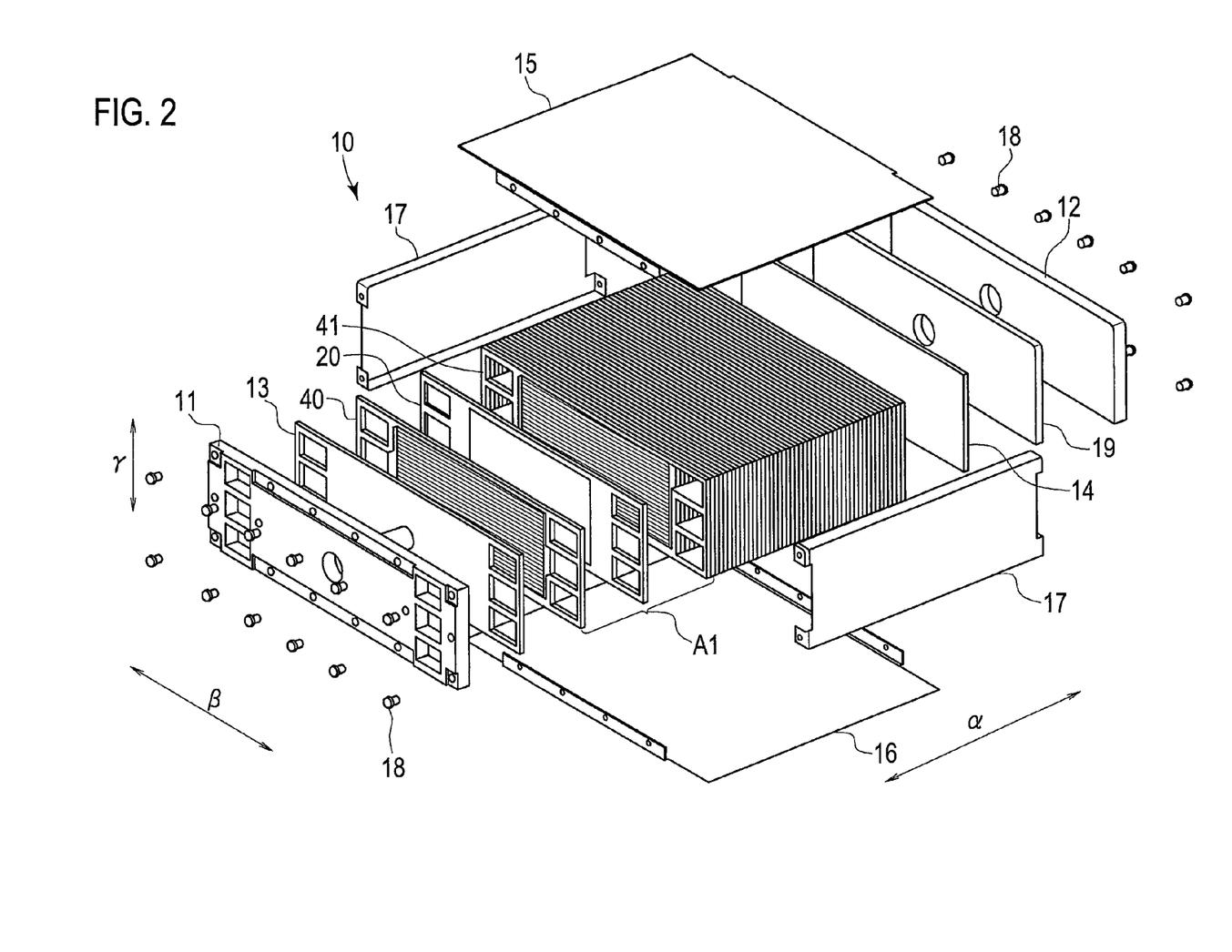
FIG. 2 is an exploded perspective view of the fuel cell stack of FIG. 1.

As shown in FIGS. 1 and 2, the fuel cell stack 10 includes the multiple fuel cells A1 stacked in the stacking direction $\alpha$, a pair of current collectors 13, 14 disposed outside the multiple fuel cells A1 in the stacking direction α, and a pair of end plates 11, 12 disposed outside the current collectors 13, 14 in the stacking direction α. The pair of end plates 11, 12 are fastened together by fastening plates 15, 16 and reinforcement plates 17, 17 and the multiple fuel cells A1 and the like arranged between the pair of end plates 11, 12 are thus pressed. In the embodiment, a spacer 19 is provided between one end plate 12 and the current collector 14. Moreover, although the end plates 11, 12 are fastened to the fastening plates 15, 16 and the reinforcement plates 17, 17 by bolts 18 and the like in the embodiment, the fastening method is not limited to this.

Figure 3:
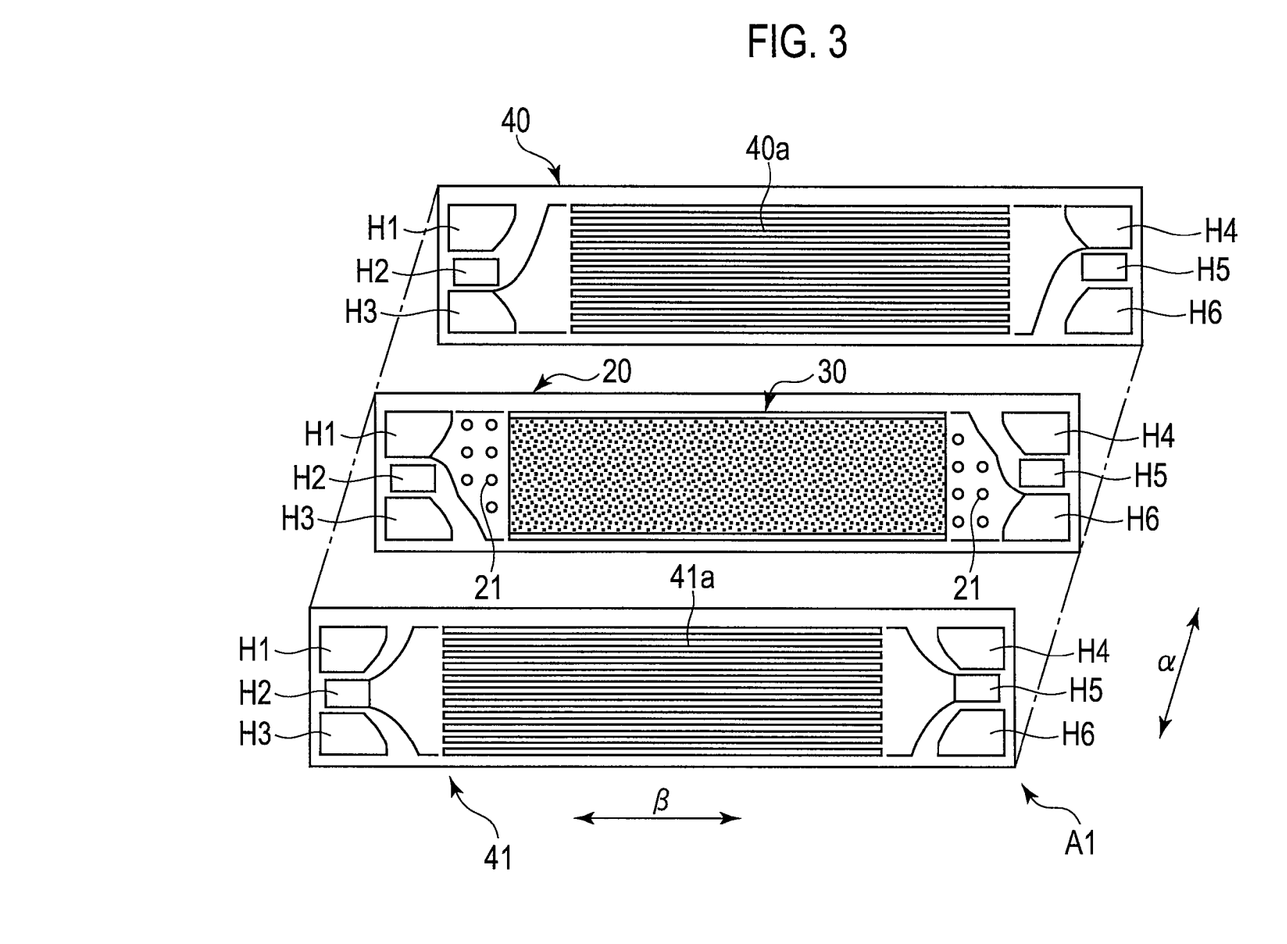
FIG. 3 is an exploded perspective view of the fuel cell in the first embodiment of the present invention.
Figure 4:
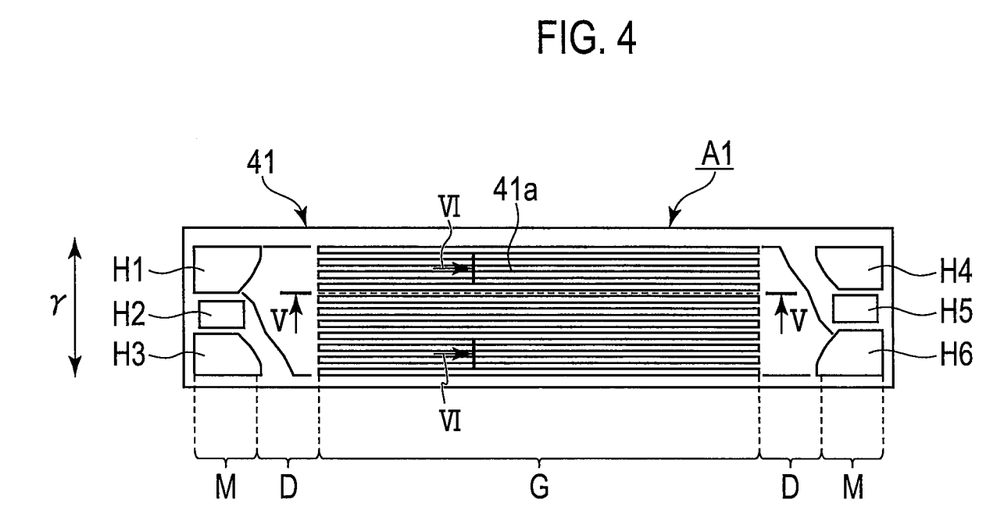
FIG. 4 is a plan view of the fuel cell in the first embodiment of the present invention.

As shown in FIG. 3, each of the fuel cells A1 is formed such that a pair of separators 40, 41 hold therebetween a membrane electrode assembly 30 and a plastic frame body 20 (hereafter, referred to as "frame") formed integrally around the membrane electrode assembly 30. A power generation portion G is formed in a region of the fuel cell A1 corresponding to the membrane electrode assembly 30.

Each fuel cell A1 includes manifold portions M, M for supplying and discharging a hydrogen-containing gas or an oxygen-containing gas, on both outer sides of the power generation portion G in the cell longitudinal direction β. Moreover, the fuel cell A1 includes diffuser portions D, D in regions between the manifold portions M and the power generation portion G, the diffuser portions D, D being flow regions for the hydrogen-containing gas or the oxygen-containing gas from the manifold portions M to the power generation portion G.

The diffuser portions D are each formed between the frame 20 and a corresponding one of the separators 40, 41 on both sides in the stacking direction α, i.e. formed respectively in an anode 32 side and a cathode 33 side.

Moreover, the manifold portion M on one side in the cell longitudinal direction β includes manifold holes H1 to H3. The manifold holes H1 to H3 includes the manifold hole H1 for supplying the oxygen-containing gas, the manifold hole H2 for supplying cooling fluid, and the manifold hole H3 for supplying the hydrogen-containing gas. Each of the manifold holes H1 to H3 forms a passage extending in the stacking direction α in the fuel cell stack 10. The manifold portion M on the other side in the cell longitudinal direction β includes manifold holes H4 to H6. The manifold holes H4 to H6 includes the manifold hole H4 for discharging the hydrogen-containing gas, the manifold hole H5 for discharging cooling fluid, and the manifold hole H6 for discharging the oxygen-containing gas. Each of the manifold holes H4 to H6 forms a passage extending in the stacking direction α in the fuel cell stack 10. Note that the positional relationship of the manifold holes for supplying and the manifold holes for discharging may be partially or entirely opposite.

Figure 7:
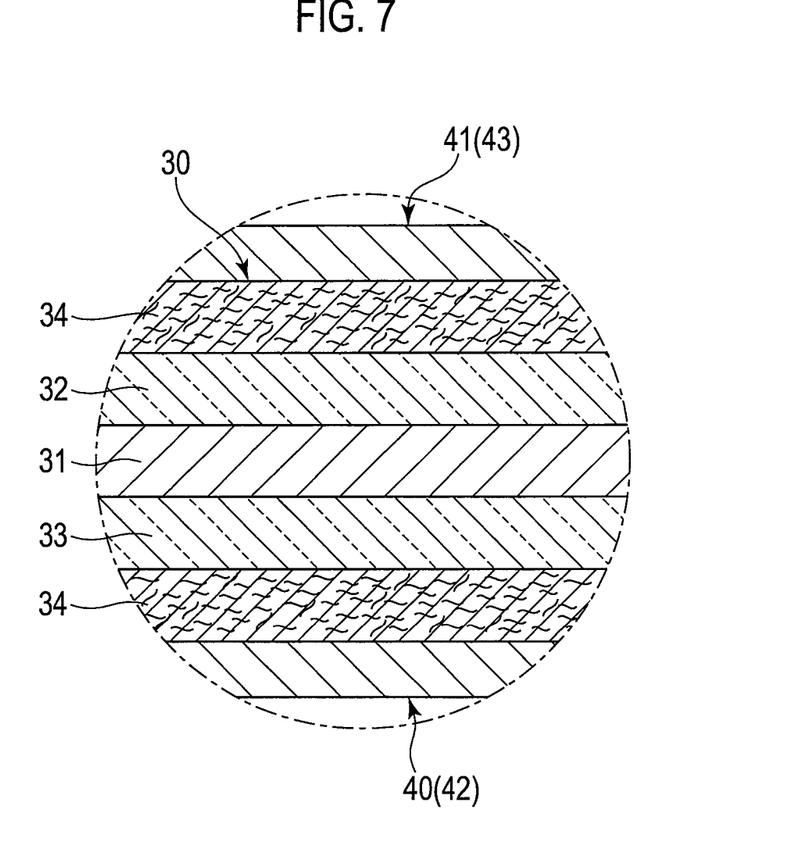
FIG. 7 is an enlarged view of a VII portion in FIG. 5.

The membrane electrode assembly 30 is also referred to as MEA and has a structure as shown in FIG. 7 in which the anode 32 is joined to one surface of an electrolyte membrane 31 made of, for example, solid polymer while the cathode 33 is joined to the other surface thereof. In the embodiment, a gas diffusion layer 34 made of carbon paper, porous body, or the like is stacked on a surface of the anode 32. Moreover, in the embodiment the gas diffusion layer 34 is also stacked on the surface of the cathode 33. Note that the membrane electrode assembly 30 may include the electrolyte membrane 31, the anode 32, and the cathode 33 with no gas diffusion layers 34 provided. In the membrane electrode assembly 30, power is generated through electrochemical reaction by supplying the hydrogen-containing gas to the anode 32 and supplying the oxygen-containing gas to the cathode 33. In other words, the fuel cells A1 generate power by causing the hydrogen-containing gas and the oxygen-containing gas to separately flow into and out from the anodes 32 and the cathodes 33.

Figure 5:
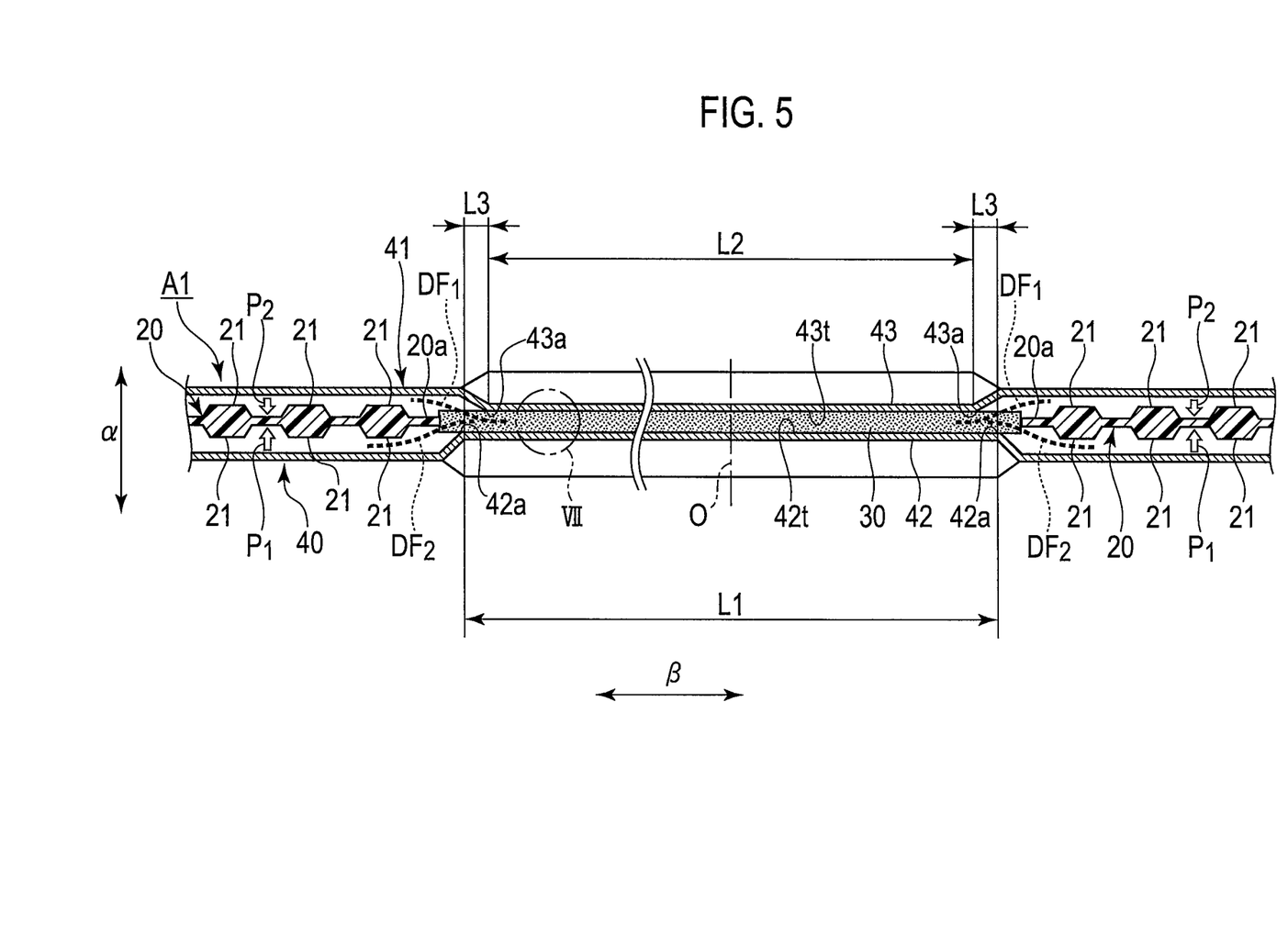
FIG. 5 is a cross-sectional view of a portion along the V-V line in FIG. 4.

As shown in FIG. 3, the frame 20 is formed integrally with the membrane electrode assembly 30 by, for example, injection molding. In the embodiment, the frame 20 has a horizontal-rectangular shape which elongates in the cell longitudinal direction β in a plan view in the stacking direction α. The membrane electrode assembly 30 is disposed in a center portion of the frame 20. As shown in FIG. 5, in the frame 20, the supporting portions 20a support outer peripheral edges of the membrane electrode assembly 30. Moreover, the frame 20 is formed to have a substantially-constant plate thickness.

Multiple frustoconical protrusions 21 for spacing the frame 20 and the separators 40, 41 facing the frame 20 apart from one another are provided at predetermined intervals to protrude in portions of the frame 20 corresponding to the diffuser portions D. Note that positions where the protrusions 21 are formed are not limited to the frame 20. Specifically, the protrusions 21 may be formed on separators 40, 41 or formed in such a way as to be appropriately divided in terms of height into a part on the frame 20 and a part on the separator 40 or 41. Note that the supporting portions 20a supporting both end portions of the membrane electrode assembly 30 in the cell longitudinal direction β define the passages for the hydrogen-containing gas or the oxygen-containing gas in the diffuser portions D.

Figure 6:
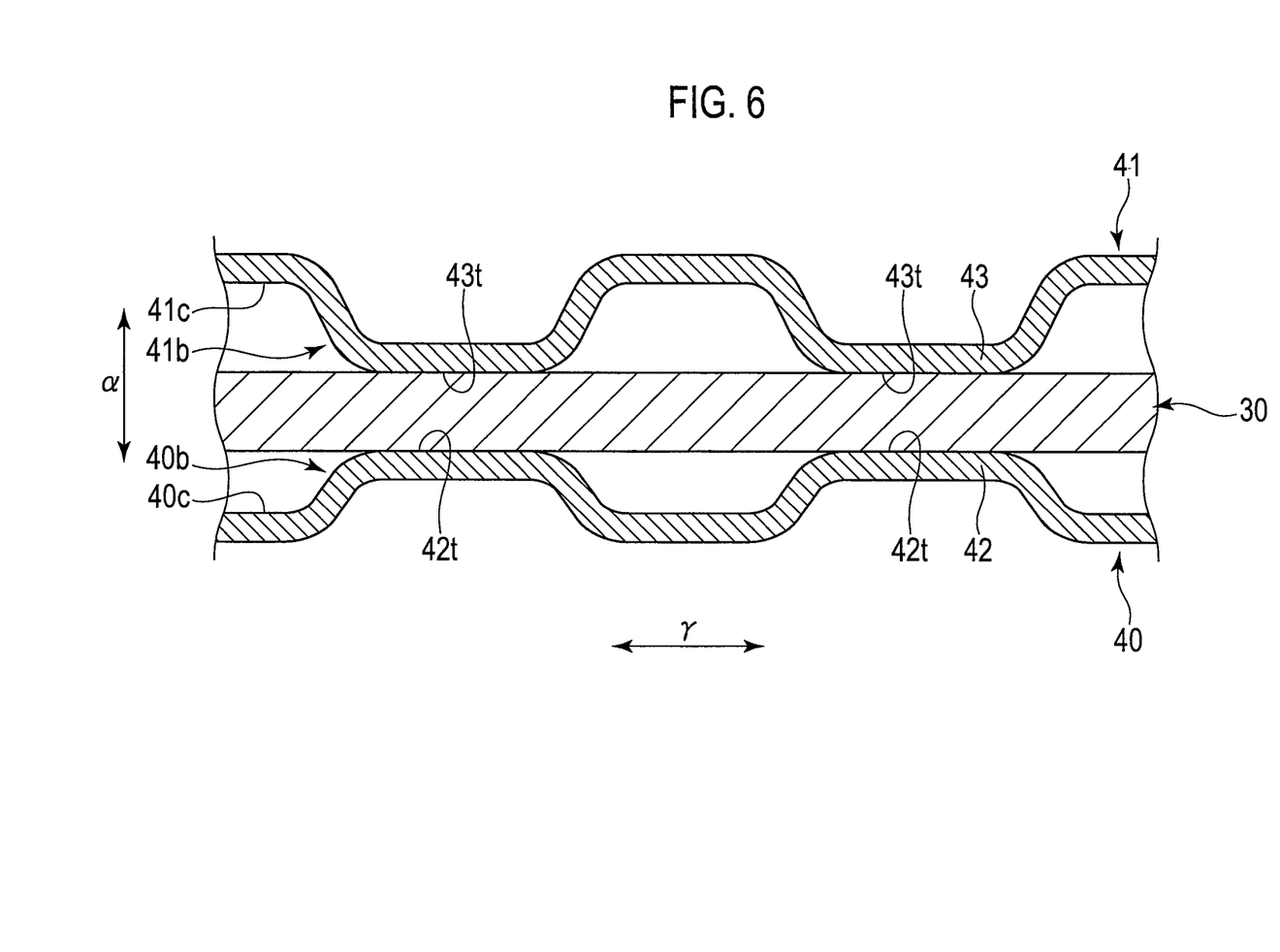
FIG. 6 is a cross-sectional view of a portion along the VI-VI line in FIG. 4.

The separators 40, 41 are each formed by pressing a metal plate made of stainless steel or the like. As shown in FIGS. 3 to 6, center portions 40a, 41a of the separators 40, 41 which face the membrane electrode assembly 30 have protruding and recessed shapes. Multiple ridges 40b, 41b and multiple valleys 40c, 41c which continuously extend substantially parallel to the cell longitudinal direction β are formed in the protruding-and-recessed shaped portions. As shown in FIG. 6, these ridges 40b, 41b and valleys 40c, 41c are arranged alternately in the cell width direction γ.

The ridges 40b, 41b are in contact with the membrane electrode assembly 30 at top faces 42t, 43t thereof. The ridges 40b formed to protrude in the center portion 40a of the separator 40 and the ridges 41b formed to protrude in the center portion 41a of the separator 41 are arranged to face one another with the membrane electrode assembly 30 interposed therebetween. As shown in FIG. 5, each pair of the ridges 40b, 41b arranged to face each other function as holding pieces 42, 43 which hold the membrane electrode assembly 30 therebetween such that the top faces 42t, 43t are in contact with the membrane electrode assembly 30. Meanwhile, the valleys 40c, 41c each define a passage for the hydrogen-containing gas or the oxygen-containing gas.

The manifold holes H1 to H6 are formed in both end portions of the separators 40, 41 in the cell longitudinal direction β. The manifold holes H1 to H6 of the separators 40, 41 have the same shape and the same size as the manifold holes H1 to H6 of the frame 20 and are formed at positions facing the manifold holes H1 to H6 of the frame 20, respectively.

In the embodiment, positions of holding end portions 42a, 43a of the holding pieces 42, 43 which are the ridges 40b, 41b of the separators 40, 41 are shifted from one another so as not to directly face one another in the stacking direction α of the fuel cells A1. "Shifted from one another so as not to directly face one another in the stacking direction α of the fuel cells A1" refers to a state where the holding end portions 42a, 43a of the holding pieces 42, 43 which are located on both sides with the frame 20 and/or the membrane electrode assembly 30 interposed therebetween are offset from one another in a plane direction (direction orthogonal to the stacking direction α, for example, the cell longitudinal direction β) of the membrane electrode assembly 30 so as not to overlap one another in the plan view in the stacking direction α. Specifically, the pair of holding pieces 42, 43 disposed to face each other with the membrane electrode assembly 30 interposed therebetween are formed in such a way that positions of the end portions (holding end portions) 42a of the top face 42t of the holding piece 42 and positions of the end portions (holding end portions) 43a of the top face 43t of the holding piece 43 are offset from one another in the plane direction of the membrane electrode assembly 30.

In other words, in FIG. 5, the lengths L1, L2 of the holding piece 42, 43 extending outward from a center axis O of the fuel cell stack 10 in the cell longitudinal direction β are each set to be long or short and the end portions 42a, 43a of the holding pieces 42, 43 are thus located at positions not facing one another in the stacking direction α.

In the embodiment, the holding pieces 42, 43 of the separators 40, 41 are different in holding length. Specifically, the length L1 of the top face 42t of each holding piece 42 in the separator 40 is set to be longer than the length L2 of the top face 43t of each holding piece 43 in the separator 41. More specifically, the length L1 between both end portions 42a of the top face 42t of the holding piece 42 in the plane direction of the membrane electrode assembly 30 is larger than the length L2 between both end portions 43a of the top face 43t of the holding piece 43 in the plane direction of the membrane electrode assembly 30. Accordingly, a necessary interval L3 in the plane direction (cell-longitudinal direction β in the embodiment) of the membrane electrode assembly 30 is provided between each end portion 42a of the holding piece 42 and the corresponding end portion 43a of the holding piece 43.

In each of the fuel cells A1 of the first embodiment described above, the positions of the holding end portions 42a, 43a of the holding pieces 42, 43 of both of the separators 40, 41 are shifted from one another in the stacking direction α of the fuel cells A1. Accordingly, it is possible to distribute bending stress and a shearing force which act on the frame 20 or the membrane electrode assembly 30 when a differential pressure is generated. This can prevent breakage caused by stress attributable to the differential pressure between the hydrogen-containing gas and the oxygen-containing gas.

Moreover, in the fuel cells A1, a portion where a stress is generated when the differential pressure is generated can be prevented from being concentrated at one point. Accordingly, the life of the fuel cells A1 can be increased in regard to bending fatigue.

Specifically, in each of the fuel cells A1, for example, when the pressure of the gas in the diffuser portions D is higher on the separator 40 side than that on the separator 41 side, a load attributable to the differential pressure is applied to the membrane electrode assembly 30 and the frame 20 in the direction of the arrow $P_1$ in FIG. 5. This causes center planes of the membrane electrode assembly 30 and the frame 20 to be displaced as shown by the curves $DF_1$ in FIG. 5. To be more specific, bending of the membrane electrode assembly 30 and the frame 20 starts at the holding end portions 43a of the holding pieces 43 in the separator 41, and the membrane electrode assembly 30 and the frame 20 are displaced toward the separator 41 outside the holding end portions 43a in the cell longitudinal direction β. At this time, a bending moment or bending stress generated in the membrane electrode assembly 30 and the frame 20 is large near the holding end portions 43a.

Meanwhile, for example, when the pressure of the gas in the diffuser portions D is higher on the separator 41 side than that on the separator 40 side, a load attributable to the differential pressure is applied to the membrane electrode assembly 30 and the frame 20 in the direction of the arrow $P_2$ in FIG. 5. This causes the center planes of the membrane electrode assembly 30 and the frame 20 to be displaced as shown by the curves $DF_2$ in FIG. 5. To be more specific, bending of the membrane electrode assembly 30 and the frame 20 starts at the holding end portions 42a of the holding pieces 42 in the separator 40, and the membrane electrode assembly 30 and the frame 20 are displaced toward the separator 40 outside the holding end portions 42a in the cell longitudinal direction β. At this time, the bending moment or the bending stress generated in the membrane electrode assembly 30 and the frame 20 is large near the holding end portions 42a away from the holding end portions 43a in the plane direction by the interval L3.

As described above, in the embodiment, the portion where the stress is generated when the differential pressure is generated is not concentrated at one point.

Second Embodiment

Fuel cells A2 in a second embodiment of the present invention are described with reference to FIG. 8. In the fuel cells A2, configurations of membrane electrode assembly 50 and separators 60, 61 are different from those of the membrane electrode assembly 30 and the separators 40, 41 of the fuel cells A1 in the first embodiment. Descriptions are given below of points which are different. Parts which are the same as those described in the first embodiment are denoted by the same reference numerals and description thereof is omitted.

Figure 8:
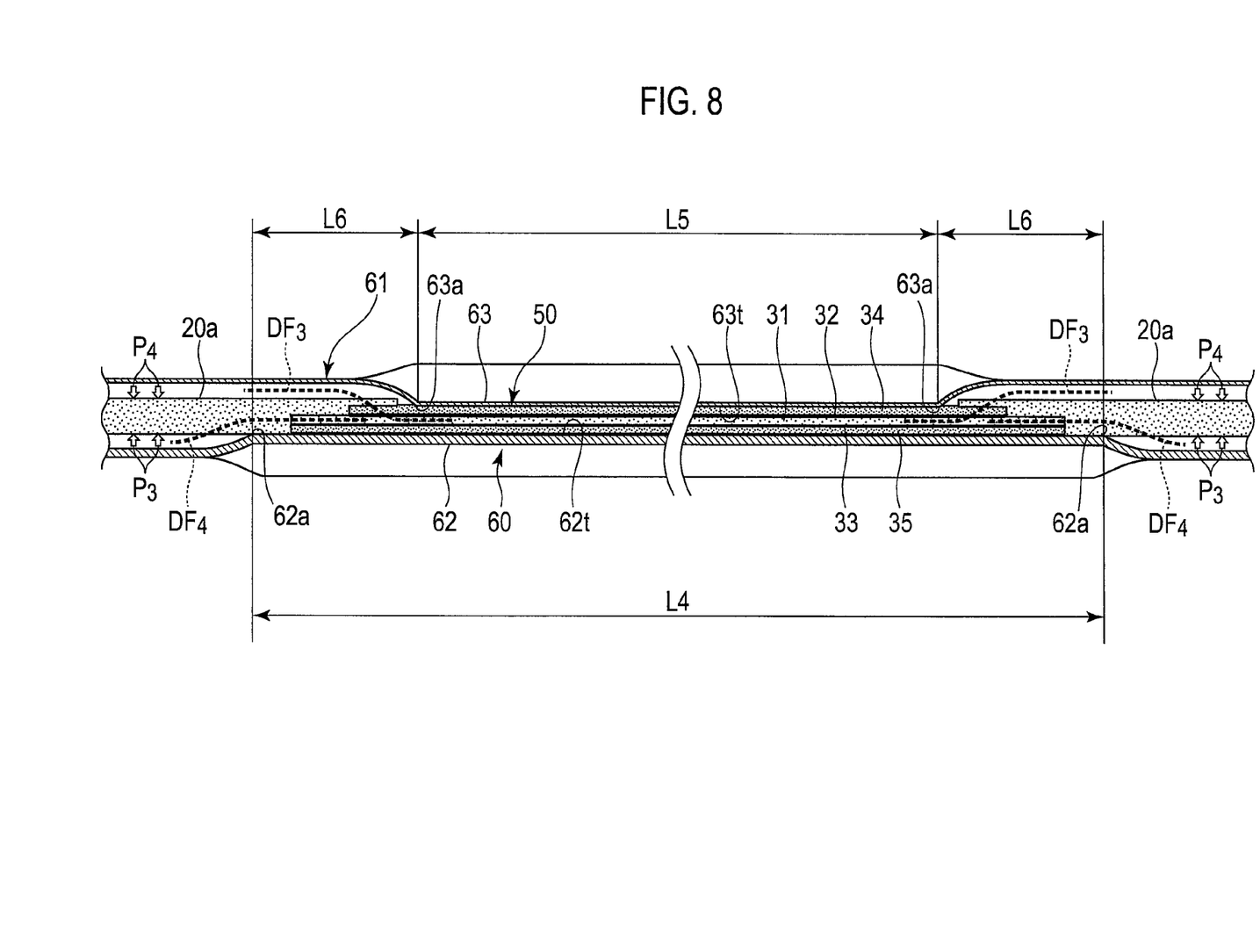
FIG. 8 is a cross-sectional view of a portion corresponding to FIG. 5 in a fuel cell in a second embodiment of the present invention.

As shown in FIG. 8, in the membrane electrode assembly 50, an anode 32 is joined to one surface of an electrolyte membrane 31 made of, for example, solid polymer while a cathode 33 is joined to the other surface thereof, and gas diffusion layers 34, 35 made of carbon paper, porous body, or the like are stacked respectively on surfaces of the anode 32 and the cathode 33. Supporting portions 20a of a frame 20 support outer peripheral edges of the membrane electrode assembly 50.

In the embodiment, the gas diffusion layer 35 on the cathode 33 side is formed to be longer than the gas-diffusion layer 34 on the anode 32 side. The gas diffusion layer 35 on the cathode 33 side protrude outside both end portions of the gas diffusion layer 34 on the anode 32 side in a cell longitudinal direction β by the same length.

The separators 60, 61 are each formed by pressing a metal plate made of stainless steel or the like. As shown in FIG. 8, center portions of the separators 60, 61 which face the membrane electrode assembly 50 have protruding and recessed shapes. Multiple ridges and multiple valleys which continuously extend substantially parallel to in the cell longitudinal direction β are formed in the protruding-and-recessed shaped portions. These ridges and valleys are arranged alternately in the cell width direction γ.

The ridges are in contact with the membrane electrode assembly 50 at top faces 62t, 63t thereof. The ridges formed to protrude in the center portion of the separator 60 and the ridges formed to protrude in the center portion of the separator 61 are arranged to face one another with the membrane electrode assembly 50 interposed therebetween. As shown in FIG. 8, each pair of the ridges arranged to face each other function as holding pieces 62, 63 which hold the membrane electrode assembly 50 therebetween such that the top faces 62t, 63t are in contact with the membrane electrode assembly 50. Meanwhile, the valleys each define a passage for the hydrogen-containing gas or the oxygen-containing gas.

Manifold holes H1 to H6 (not illustrated) are formed in both end portions of the separators 60, 61 in the cell longitudinal direction β. The manifold holes H1 to H6 of the separators 60, 61 have the same shape and the same size as the manifold holes H1 to H6 of the frame 20 and are formed at positions facing the manifold holes H1 to H6 of the frame 20, respectively.

In the embodiment, positions of holding end portions 62a, 63a of the holding pieces 62, 63 in the separators 60, 61 are shifted from one another so as not to directly face one another in a stacking direction α of the fuel cells A2. Moreover, in the embodiment, the length L4 of the top face 62t of each holding piece 62 in the separator 60 is set to be longer than the length L5 of the top face 63t of each holding piece 63 in the separator 61. Specifically, the length L4 between both end portions 62a of the top face 62t of the holding piece 62 in the plane direction of the membrane electrode assembly 50 is larger than the length L5 between both end portions 63a of the top face 63t of the holding piece 63 in the plane direction of the membrane electrode assembly 50. A necessary interval L6 in the plane direction (cell-longitudinal direction β in the embodiment) of the membrane electrode assembly 50 is provided between each end portion 62a of the holding piece 62 and the corresponding end portion 63a of the holding piece 63.

Moreover, in the embodiment, each holding piece 62 of the separator 60 whose holding length is relatively long is in contact with the gas diffusion layer 35 and the frame 20. Specifically, the top face 62t of the holding piece 62 of the separator 60 is in contact with both of the gas diffusion layer 35 and the supporting portions 20a of the frame 20, and the end portions (holding end portions) 62a of the top face 62t of the holding piece 62 are located on the supporting portions 20a of the frame 20. Meanwhile, the top face 63t of each holding piece 63 of the separator 61 is in contact with the gas diffusion layer 34, and the end portions (holding end portions) 63a of the top face 63t of the holding piece 63 are located on the gas diffusion layer 34 of the membrane electrode assembly 50.

In the fuel cells A2 of the second embodiment described above, bending does not start at a portion having a low strength when a differential pressure is generated, and a portion where a stress is generated is not concentrated at one point. Accordingly, the life of the fuel cells A2 can be increased in regard to bending fatigue.

Specifically, in each of the fuel cells A2, for example, when the pressure of the gas in the diffuser portions D is higher on the separator 60 side than that on the separator 61 side, a load attributable to a differential pressure is applied to the membrane electrode assembly 50 and the frame 20 in the direction of the arrows $P_3$ in FIG. 8. This causes center planes of the membrane electrode assembly 50 and the frame 20 to be displaced as shown by the curves $DF_3$ in FIG. 8. To be more specific, bending of the membrane electrode assembly 50 and the frame 20 starts at the holding end portions 63a of the holding pieces 63 in the separator 61, and the membrane electrode assembly 50 and the frame 20 are displaced toward the separator 61 outside the holding end portions 63a in the cell longitudinal direction β. At this time, a bending moment or bending stress generated in the membrane electrode assembly 50 and the frame 20 is large near the holding end portions 63a.

Meanwhile, for example, when the pressure of the gas in the diffuser portions D is higher on the separator 61 side than that on the separator 60 side, a load attributable to the differential pressure is applied to the membrane electrode assembly 50 and the frame 20 in the direction of the arrows $P_4$ in FIG. 8. This causes the center planes of the membrane electrode assembly 50 and the frame 20 to be displaced as shown by the curves $DF_4$ in FIG. 8. To be more specific, bending of the membrane electrode assembly 50 and the frame 20 starts at the holding end portions 62a of the holding pieces 62 in the separator 60, and the membrane electrode assembly 50 and the frame 20 are displaced toward the separator 60 outside the holding end portions 62a in the cell longitudinal direction β. At this time, the bending moment or the bending stress generated in the membrane electrode assembly 50 and the frame 20 is large near the holding end portions 62a away from the holding end portions 63a in the plane direction by the interval L6.

As described above, in the embodiment, the portion where the stress is generated when the differential pressure is generated is not concentrated at one point. Moreover, in the embodiment, since the holding end portions 62 of the holding pieces 62 are located on the supporting portions 20a of the frame 20, a portion where the bending moment or the bending stress is large when the differential pressure is generated can be prevented from being formed in a portion having a low strength.

Although the embodiments of the present invention have been described above, these embodiments are merely examples described to facilitate the understanding of the present invention and the present invention is not limited to the embodiments. The technical scope of the present invention is not limited to specific technical matters disclosed in the embodiments and like described above, and includes various modifications, changes, alternative techniques, and the like which can be easily derived therefrom.

This application claims the benefit of priority from Japanese Patent Application No. 2011-085524 filed on Apr. 7, 2011, the entire contents of which are incorporated herein by reference.

INDUSTRIAL APPLICABILITY

The present invention can distribute the stress acting on the frame or the membrane electrode assembly attributable to the differential pressure between the hydrogen-containing gas and the oxygen-containing gas and thereby prevent breakage.

REFERENCE SIGNS LIST 20 frame body (frame)
30, 50 membrane electrode assembly
31 electrolyte membrane
32 anode
33 cathode
34, 35 gas diffusion layer
40, 41, 60, 61 separator
42, 43, 62, 63 holding piece
42a, 43a holding end portions
62a, 63a holding end portions
A1, A2 fuel cell

The invention claimed is:

1. A fuel cell comprising:
   a membrane electrode assembly including an anode joined to one surface of an electrolyte membrane and a cathode joined to another surface of the electrolyte membrane;
   a frame body formed integrally with the membrane electrode assembly; and
   a pair of separators holding the membrane electrode assembly and the frame body therebetween, wherein
   a diffuser portion which is a flow region for a hydrogen-containing gas or an oxygen-containing gas is formed between the frame body and each of the pair of separators,
   at least one pair of holding pieces holding the membrane electrode assembly therebetween are formed in the pair of separators,
   positions of holding end portions of the pair of holding pieces are offset from each other in a plane direction of the membrane electrode assembly, and one of the holding end portions of the pair of holding pieces is located at a position facing, in a stacking direction of the fuel cell, a gas flowing passage of a corresponding diffuser portion, and
   the membrane electrode assembly is held between the holding end portions of the pair of holding pieces.

2. The fuel cell according to claim 1, wherein a holding piece in the pair of holding pieces has a holding length different from a holding length of an other holding piece in the pair of holding pieces.

3. The fuel cell according to claim 2, wherein
   the membrane electrode assembly includes a gas diffusion layer, and
   a holding piece having a larger holding length than an other holding piece out of the pair of holding pieces is in contact with the gas diffusion layer and the frame body.

4. A fuel cell comprising:
   a membrane electrode assembly including an anode joined to one surface of an electrolyte membrane and a cathode joined to another surface of the electrolyte membrane;
   a frame body formed integrally with the membrane electrode assembly; and
   a pair including a first separator and a second separator holding the membrane electrode assembly and the frame body therebetween, wherein
   a first gas passage is formed between the first separator and a set including the membrane electrode assembly and the frame body,
   a second gas passage is formed between the second separator and the set including the membrane electrode assembly and the frame body,
   a first holding piece is formed in the first separator, the first holding piece holding the membrane electrode assembly such that a first surface of the first holding piece is in contact with the membrane electrode assembly, the first surface having a longitudinal direction extending in a first direction,
   a second holding piece is formed in the second separator, the second holding piece provided at a position facing the first holding piece and holding the membrane electrode assembly together with the first holding piece such that a second surface of the second holding piece is in contact with the membrane electrode assembly, the second surface having a longitudinal direction extending in the first direction, and
   a position of an end portion of the first surface in the first direction and a position of an end portion of the second surface in the first direction are offset from each other in a plane direction of the membrane electrode assembly and the end portion of the first surface in the first direction is located at a position facing, in a stacking direction of the fuel cell, the second gas passage,
   wherein the membrane electrode assembly is held between the end portion of the first surface of the first holding piece and the end portion of the second surface of the second holding piece.

5. The fuel cell according to claim 4, wherein a length of the first surface is larger than a length of the second surface.

6. The fuel cell according to claim 4, wherein
   the membrane electrode assembly includes a gas diffusion layer,
   the frame body has a supporting portion supporting an outer peripheral edge of the membrane electrode assembly, and
   the first surface is in contact with the gas diffusion layer and the supporting portion of the frame body.

7. The fuel cell according to claim 4, wherein
   the frame body has a supporting portion supporting an outer peripheral edge of the membrane electrode assembly,
   the first surface is in contact with the membrane electrode assembly and the supporting portion of the frame body, and
   the end portion of the first surface in the first direction is located at a position on the supporting portion of the frame body.

8. The fuel cell according to claim 7, wherein the end portion of the second surface in the first direction is located on the membrane electrode assembly.

9. The fuel cell according to claim 1, wherein the frame body includes a supporting portion that supports an outer peripheral edge of the membrane electrode assembly in a longitudinal direction of the fuel cell.

10. The fuel cell according to claim 9, wherein the supporting portion defines passages for the hydrogen-containing gas or the oxygen-containing gas in the diffuser portion.

11. The fuel cell according to claim 4, wherein the frame body includes a supporting portion that supports an outer peripheral edge of the membrane electrode assembly in the longitudinal direction.

* * * * *